(12) United States Patent
Toyoda et al.

(10) Patent No.: US 7,316,164 B2
(45) Date of Patent: Jan. 8, 2008

(54) PRESSURE DETECTION DEVICE AND MANUFACTURING METHOD OF THE SAME

(75) Inventors: Inao Toyoda, Anjo (JP); Hiroshige Matsui, Nishikamo-gun (JP)

(73) Assignee: DENSO CORPORATION, Kariya (JP)

( * ) Notice: Subject to any disclaimer, the term of this patent is extended or adjusted under 35 U.S.C. 154(b) by 111 days.

(21) Appl. No.: 11/332,353

(22) Filed: Jan. 17, 2006

(65) Prior Publication Data

US 2006/0156825 A1 Jul. 20, 2006

(30) Foreign Application Priority Data

Jan. 19, 2005 (JP) ............................. 2005-011465

(51) Int. Cl.
*G01L 9/00* (2006.01)
(52) U.S. Cl. .................... 73/723; 73/115; 73/117.2; 73/117.3; 73/118.1; 73/725; 73/726
(58) Field of Classification Search ................ 73/115, 73/117.2, 117.3, 118.1, 723, 725, 726
See application file for complete search history.

(56) References Cited

U.S. PATENT DOCUMENTS

| 4,993,266 | A | 2/1991 | Omura et al. |
| 6,487,898 | B1 * | 12/2002 | Haefner et al. ............... 73/115 |
| 6,889,554 | B2 * | 5/2005 | Hirota et al. ................. 73/719 |
| 7,114,396 | B2 * | 10/2006 | Oda et al. ..................... 73/715 |
| 7,159,448 | B2 * | 1/2007 | Moelkner et al. ......... 73/35.12 |
| 7,191,658 | B2 * | 3/2007 | Oda et al. ..................... 73/702 |
| 2005/0274189 | A1 * | 12/2005 | Oda et al. ..................... 73/702 |
| 2006/0090566 | A1 * | 5/2006 | Oda ............................ 73/715 |
| 2006/0090569 | A1 * | 5/2006 | Myagawa et al. ............ 73/753 |
| 2007/0113660 | A1 * | 5/2007 | Matsui ........................ 73/715 |

OTHER PUBLICATIONS

U.S. Appl. No. 11/252,015, Oda.

\* cited by examiner

*Primary Examiner*—Edward Lefkowitz
*Assistant Examiner*—Freddie Kirkland, III
(74) *Attorney, Agent, or Firm*—Posz Law Group, PLC

(57) ABSTRACT

A pressure detection device includes a sensing part that is provided at one end portion of the housing to output an electrical signal responsive to an applied pressure, a circuit part that is provided at an other end portion of the housing to process the signal from the sensing part, and a flexible printed board provided in the housing between the sensing part and the circuit part. Furthermore, the flexible printed board has a first end portion electrically connected to the sensing part at a first connecting part, and a second end portion electrically connected to the circuit part at a second connecting part. In the pressure detection device, the flexible printed board is shaped between the first and second end portions to relieve a stress applied to the connecting parts.

18 Claims, 3 Drawing Sheets

PRESSURE DETECTION DEVICE AND MANUFACTURING METHOD OF THE SAME

CROSS REFERENCE TO RELATED APPLICATION

This application is based on Japanese Patent Application No. 2005-11465 filed on Jan. 19, 2005, the contents of which are incorporated herein by reference in its entirety.

FIELD OF THE INVENTION

The present invention relates to a pressure detection device and a manufacturing method of the same, in which a sensing part is disposed at one end portion of a housing and a circuit part is disposed at an other end portion of the housing, and the sensing part and the circuit portion are electrically connected via a flexible printed board.

BACKGROUND OF THE INVENTION

As general pressure detection devices of this kind, there have been conventionally proposed devices each of which is constructed of a housing, a sensing part that is provided at one end portion of the housing to output an electric signal responsive to an applied pressure, and a circuit part that is provided at an other end portion of the housing to process the signal from the sensing part.

In the pressure detection device of this kind, the sensing part and the circuit part are provided with a distance therebetween so that the sensing part and the vicinity thereof can be made compact. In this structure, it is difficult to connect the sensing part with the circuit part by bonding wires or bumps.

Therefore, as a connecting method for connecting the distanced sensing part and the circuit part, a use of a lead wire has been proposed. For example, an electrical connection to the sensing part is realized by extending the lead wire as described in JP-Y2-6-19068, which is corresponding to U.S. Pat. No. 4,993,266.

However, in the connecting method using the lead wire for connecting the sensing part with the circuit part, a lead pin or an insulating member is disposed as described in the above publication. In this case, the structure of the pressure detection sensor becomes large or complicated, or assembling of the pressure detection sensor becomes difficult.

SUMMARY OF THE INVENTION

In view of the above-described problems, it is an object of the present invention to provide a pressure detection device having a sensing part at one end portion of a housing and a circuit part at an another end portion of the housing, which are connected by a flexible printed board having an elastically deformable portion.

It is another object of the present invention to provide a pressure detection device, which effectively prevents a disconnection at connecting parts of a sensing part and a circuit part connected with a flexible printed board so as to improve product reliability in the pressure detection device.

It is further another object of the present invention to provide a manufacturing method of a pressure detection device having a flexible printed board that is provided in a housing for connecting a sensing part and a circuit part.

According to an aspect of the present invention, a pressure detection device includes a housing, a sensing part that is provided at one end portion of the housing to output an electrical signal responsive to an applied pressure, a circuit part that is provided at an other end portion of the housing to process the signal from the sensing part, and a flexible printed board provided in the housing between the sensing part and the circuit part. In the pressure detection device, the flexible printed board has a first end portion electrically connected to the sensing part at a first connecting part, and a second end portion electrically connected to the circuit part at a second connecting part. Furthermore, the flexible printed board has a shape between the first and second end portions to relieve a stress applied to the connecting parts. Accordingly, it can effectively prevent a disconnection in the connection portions, and the pressure detection device can be normally operated for a long time.

The flexible printed board can be connected to the sensing part and the circuit part in the housing in a contracted state to be extensible and contractible in a connecting direction connecting the first and second end portions. In this case, the stress applied to the connection portions of the sensing part and the circuit part with the flexible printed board can be effectively restricted.

Furthermore, the flexible printed board can be provided with a bent portion between the first and second end portions, elastically deformable in a connection direction connecting the first and second end portions. For example, the bent portion of the flexible printed board has a zigzag shape or a coil shape to be extensible and contractible in the connection direction.

According to another aspect of the present invention, a method for manufacturing a pressure detection device includes a step of preparing a flexible printed board having first and second end portions and an elastically deformable portion between the first and second end portions, a step of providing a sensing part for outputting an electrical signal responsive to an applied pressure at one end portion of a housing, a step of providing a circuit part for processing the signal from the sensing part at an other end portion of the housing, a step of disposing the flexible printed board in the housing to be connected to the sensing part and the circuit part at the first and second end portions such that the sensing part and the circuit part are electrically connected via the flexible printed board, and a step of fixing the sensing part and the circuit part to the housing. In this method, the flexible printed board is disposed in the housing in an extended state of a length between the first and second end portions of the flexible printed board when the flexible printed board is connected to the sensing part and the circuit part before the fixing of the sensing part and the circuit part is completed. Furthermore, the flexible printed board is disposed in the housing in the contracted state of the length after the fixing of the sensing part and the circuit part is completed. Accordingly, it can effectively prevent a disconnection in the connection portions with a simple method.

The step of fixing can include a first fixing step for fixing the sensing part to the housing, and a second fixing step for fixing the circuit part to the housing. In this case, the second fixing step can be performed, after the first fixing step is performed and the flexible printed board is disposed in the housing to be connected to both the sensing part and the circuit part. Alternatively, the first fixing step can be performed, after the second fixing step is performed and the flexible printed board is disposed in the housing to be connected to both the sensing part and the circuit part.

BRIEF DESCRIPTION OF THE DRAWINGS

The above and other objects, features and advantages of the present invention will become more apparent from the following detailed description of a preferred embodiment made with reference to the accompanying drawings, in which.

DETAILED DESCRIPTION OF PREFERRED EMBODIMENT

Figure 1:
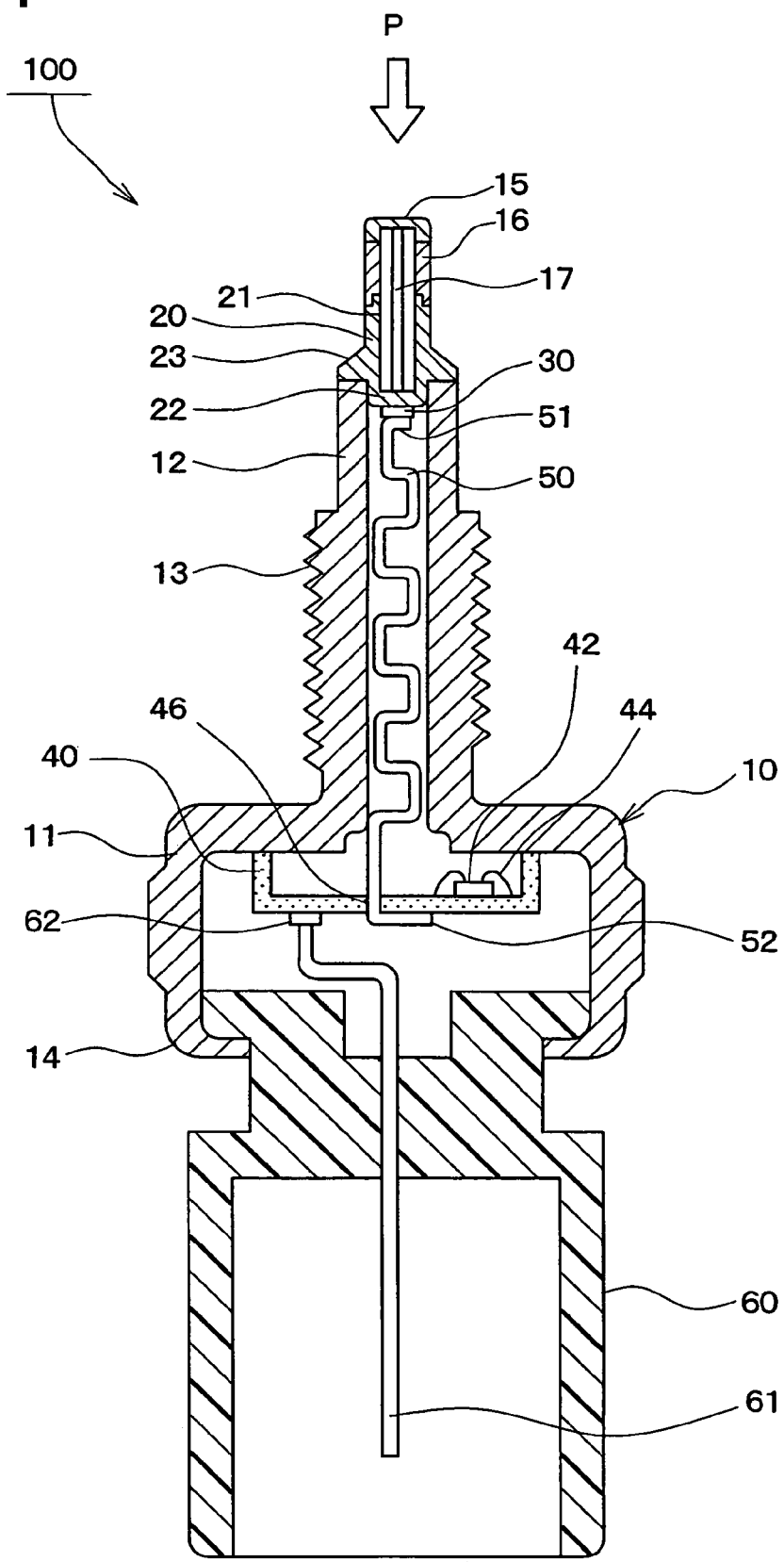
FIG. 1 is a schematic cross-sectional view showing a pressure detection device according to an embodiment of the present invention.

FIG. 1 is a cross-sectional view illustrating a pressure detection device 100 according to an embodiment of the present invention. The pressure detection device 100 is not limited to be used for specific devices. In this embodiment, the pressure detection device 100 is typically used as a combustion pressure sensor, as an example.

When the pressure detection device 100 is used for the combustion pressure sensor, a slender cylindrical pipe portion 12 of a housing 10 is inserted into a threaded hole portion formed in an engine block of an automobile and is jointed thereto by screwing, and senses pressure (cylinder pressure) in a combustion chamber as a detection pressure.

The housing 10 of the pressure detection device 100 of the present embodiment is constructed of a cylindrical main portion 11 and the slender cylindrical pipe portion 12 which is more slender than the main portion 11.

These main portion 11 and pipe portion 12 are made of metal, for example, stainless steel by cutting or cold forging. In the present embodiment, the pipe portion 12 is formed in the shape of a cylindrical pipe, but may be formed in the shape of a square pipe.

In the housing 10, the main portion 11 and the pipe portion 12 may be integrally formed. Alternatively, these portions 11, 12 can be formed separately and then can be joined to each other by welding, bonding, pressing-in, screwing, or caulking, thereby being integrated into one unit.

In the pressure detection device 100 of the present embodiment, the housing 10 has the slender pipe portion 12 protruding from its one end. Moreover, a threaded portion 13 capable of being joined by screwing to the engine block is formed on the outer peripheral surface of the pipe portion 12 in the housing 10.

The pipe portion 12 of the housing 10 is inserted into the threaded hole portion formed in the engine block via the threaded portion 13 thereby the pressure detection device 100 is mounted to the engine block.

In a state where this pressure detection device 100 is mounted to the engine block, as shown by a hollow arrow in FIG. 1, the pressure P (cylinder pressure) in the combustion chamber as the detection pressure is applied from a tip portion of the pipe portion 12.

A pressure detection element 30 as a sensing part for outputting an electric signal responsive to the applied pressure is mounted on the tip portion of the pipe portion 12 in the housing 10, which is one end of the housing 10.

Although not limited, this pressure detection element 30 can have a strain gauge function such that the pressure detection element 30 itself is deformed by the applied pressure to output a signal responsive to a detection pressure on the basis of its deformation.

In the present embodiment, a metal stem 20 is a hollow cylinder whose one end is an opening portion 21 and whose other end is a closed by a diaphragm 22 as a thin straining part. The pressure detection element 30 is fixed to the outer surface of the diaphragm 22 of the metal stem 20 by fused glass or the like.

The metal stem 20 is constructed as a metal part made of cobalt or the like and is formed into the shape of a hollow cylinder. A flange 23 is formed on the outer peripheral surface of the metal stem 20 protruding to a direction, which crosses at a substantially right angle with the outer peripheral surface. It is assumed in this example that the hollow portion of the metal stem 20 is cylindrical, but the hollow portion of this metal stem 20 may be also square.

The metal stem 20 is inserted into the pipe portion 12 such that the diaphragm 22 is faced to the inside of the pipe portion 12 and the opening portion 21 is faced toward the combustion chamber. The flange 23 of the metal stem 20 is joined and fixed by welding or bonding to an opening portion of the tip portion of the pipe portion 12.

The pressure detection element 30 is fixed to the tip portion of the pipe portion 12 which is provided at the one end of the housing 10. Here, the outer peripheral surface of the flange 23 of the metal stem 20 is a tapered surface tapered in a direction to the diaphragm 22 from the opening portion 21 such that a diameter of the flange 23 extends as shown in FIG. 1.

When the pressure detection device 100 is screwed to the engine block via the threaded portion 13, the tapered surface of the flange 23 and an inner surface of a threaded hole of the engine block are attached firmly and sealed.

As shown in FIG. 1, a metal case 16 formed from a metal plate, for example, stainless steel into a cylindrical shape is joined and fixed to the opening portion 21 of the metal stem 20 by welding or the like at the tip portion of the pipe portion 12 in the housing 10.

A pressure receiving diaphragm 15 that receives pressure is provided at a tip portion of the metal case 16. The opening portion 21 of the metal stem 20 is sealed with the pressure receiving diaphragm 15 via the metal case 16.

This pressure receiving diaphragm 15 is made of metal such as stainless steel in the shape of a circular plate and its peripheral portion is joined and fixed to the tip portion the metal case 16 by brazing, welding, or the like.

Accordingly, the pressure receiving diaphragm 15 is integrated with the metal stem 20 via the metal case 16. As shown by hollow arrows in FIG. 1, this pressure receiving diaphragm 15 faces the above-described combustion chamber and receives the combustion pressure P (cylinder pressure), thereby being strained.

Moreover, a pressure transmission part 17 is provided in a space formed by the hollow portion of the metal stem 20 and the hollow portion of the metal case 16. In the present example, the pressure transmission part 17 is a part formed in the shape of a bar.

In this manner, the pressure transmission part 17 is interposed between the pressure receiving diaphragm 15 and the diaphragm 22 as a pressure sensing part of the metal stem 20. This pressure transmission part 17 is made of metal such as stainless steel, ceramic, or the like.

One end portion (bottom end portion in FIG. 1) of the pressure transmission part 17 is in contact with the diaphragm 22 of the metal stem 20 in the state where a load is applied to the diaphragm 22 of the metal stem 20, and an other end portion (top end portion in FIG. 1) of the pressure transmission part 17 is in contact with the pressure receiving diaphragm 15 in the state where the load is applied to the pressure receiving diaphragm 15.

Although the pressure transmission part 17 is a bar-shaped part in this example, it is not limited to this shape but may be a part formed in the shape of a sphere, a semi-sphere, or a drum. The detection pressure P is applied from the pressure receiving diaphragm 15 to the diaphragm 22 of the metal stem 20 and the pressure detection element 30 via the pressure transmission part 17.

Moreover, as the pressure detection element 30 having a strain gauge function, although not limited, an element can be employed in which a bridge circuit constructed of a diffused resistance element and the like is formed on a silicon semiconductor chip by a semiconductor process, for example.

The semiconductor chip having the strain gauge function like this has a function such that when the diaphragm 22 as the pressure sensing part of the metal stem 20 is deformed by pressure, the semiconductor chip itself is strained to develop a change in resistance and converts the change in resistance to an electric signal and outputs the electric signal.

In the present embodiment, the pressure detection element 30 is constructed as a sensing part that outputs an electric signal responsive to the pressure applied thereto, and the pressure detection element 30 and the diaphragm 22 of the metal stem 20 are constructed as parts that receive load applied by the detection pressure P, thereby being strained. The diaphragm 22 and the pressure detection element 30 have an effect on the fundamental function of the pressure detection device 100.

Further describing a metal material constructing the metal stem 20, the metal material is required to have high strength because it receives high pressure and to have a low coefficient of thermal expansion because the pressure detection element 30 made of Si semiconductor or the like is bonded to the metal stem 20 by glass having a low melting point or the like.

Specifically, as the metal material constructing the metal stem 20, a material including Fe, Ni, Co or Fe, Ni as main components and having Ti, Nb, Al or Ti, Nb added thereto as precipitation hardening components, for example, precipitation hardening stainless steel can be selected. This metal stem 20 can be formed by pressing, cutting, or cold forging.

As shown in FIG. 1, in the present pressure detection device 100, a circuit board 40 made of a ceramic board or the like is provided in the main portion 11 of the housing 10.

The circuit board 40 is provided in such a way as to cover the opening portion of the pipe portion 12 at the boundary between the pipe portion 12 and the main portion 11, and the peripheral portion of the circuit board 40 is fixed to the housing 10, for example, by bonding.

An IC chip 42 is mounted by bonding or the like on a surface facing the opening portion of the pipe portion 12 in the circuit board 40. The IC chip 42 is provided such that a circuit for amplifying and adjusting the output from the pressure detection element 30 is formed thereon.

The IC chip 42 and the circuit board 40 are connected to each other by bonding wires 44 made of aluminum (Al) or gold, thereby being electrically connected to each other.

The circuit board 40 having the IC chip 42 which is electrically connected with the circuit board 40 via bonding wires 44 is constructed as a circuit part for processing the signal from the pressure detection element 30.

Further, a flexible printed board 50 having a flexibility is disposed between the pressure detection element 30 and the circuit board 40 in the housing 10.

A general board made by patterning an electric conductor made of copper or the like on a base made of polyimide resin can be used for the flexible printed board 50. As shown in FIG. 1, the flexible printed board 50 is arranged in the pipe portion 12 of the housing 10 in such a way as to extend in the longitudinal direction of the pipe portion 12.

One end portion 51 of the flexible printed board 50 is electrically and mechanically bonded to the pressure detection element 30 by the use of solder or the like. Specifically, although not shown, a conductor portion of the flexible printed board 50 is connected to a pad formed on the surface of the pressure detection element 30.

On the other hand, a portion of an other end portion 52 of the flexible printed board 50 is located in the main portion 11 of the housing 10. The other end portion 52 of the flexible printed board 50 passes through a through hole 46 formed in the circuit board 40 and is fitted onto a surface opposite to a surface on which the IC chip 42 is mounted in the circuit board 40.

The other end portion 52 of the flexible printed board 50 is electrically connected to the circuit board 40 via solder or the like on the surface opposite to the surface on which the IC chip 42 is mounted in the circuit board 40. Accordingly, the pressure detection element 30 is electrically connected to the circuit board 40 via the flexible printed board 50.

In the pressure detection device 100 according to this embodiment, the flexible printed board 50 has a shape so that a stress applied to connecting parts thereof with the pressure detection element 30 and with the circuit board 40 can be reduced by itself.

Specifically, the flexible printed board 50 in FIG. 1 shows a contracted state, and is formed to be elastically deformable. As shown in FIG. 1, the flexible printed board 5 is formed into substantially a zigzag shape to be extensible and contractible in a connection direction connecting the one end portion 51 and the other end portion 52.

The flexible printed board 50 shown in FIG. 1 extends and contracts along the connection direction. The one end portion 51 of the flexible printed board 50 is connected to the pressure detection element 30, and the other end portion 52 of the flexible printed board 50 is connected to the circuit board 40.

The above-described elastically deformable flexible printed board 50 can be easily formed by cutting a board on which wirings are pre-formed, into a zigzag shape, for example. The contracted shape of the flexible printed board 50 shown in FIG. 1 corresponds to a normally using shape of the board 50 when no stress is applied thereto.

Also as shown in FIG. 1, a connector case 60 having a terminal 61 is provided at a position in the housing 10, opposite to a connecting surface of the circuit board 40 with the flexible printed board 50.

The connector case 60 is formed from resin such as polyphenylene sulphide (PPS), and the terminal 61 is integrally formed with the connector case 60 by insert-molding. The connector case 60 is constructed as a connector part for sending the signals from the pressure detection element 30 and the circuit board 40.

The terminal 61 integrated with the connector case 60 is put into spring contact with the circuit board 40 via a spring part 62, thereby the pressure detection element 30 and the terminal 61 of the connector case 60 are electrically connected via the flexible printed board 50 and the circuit board 40.

As shown in FIG. 1, an end portion 14 of the main portion 11 of the housing 10 is caulked to the connector case 60 thereby the connector case 60 and the housing 10 are integrally fixed.

The terminal 61 can be electrically connected to an ECU of an automobile, for example, via wiring members (not shown). Accordingly, the pressure detection device 100 can send or receive a signal to or from an exterior.

The pressure detection device 100 is connected and fixed to the engine block having therein a subject for pressure detection, by being inserted into the threaded hole formed in the engine block via the threaded portion 13 of the housing 10 by screwing.

The pressure P (cylinder pressure) in the combustion chamber is applied to the diaphragm 22 of the metal stem 20 from the pressure receiving diaphragm 15 via the pressure transmission part 17 as shown by the hollow arrow in FIG. 1. Then, the diaphragm 22 of the metal stem 20 is deformed by the applied pressure, and the pressure detection element 30 converts this deformation to an electric signal responsive to the pressure for the pressure detection.

The electric signal outputted from the pressure detection element 30 is transmitted to the circuit board 40 via the flexible printed board 50 and is processed by the IC chip 42. The processed signal is outputted from the terminal 61 to the exterior.

Figure 2:
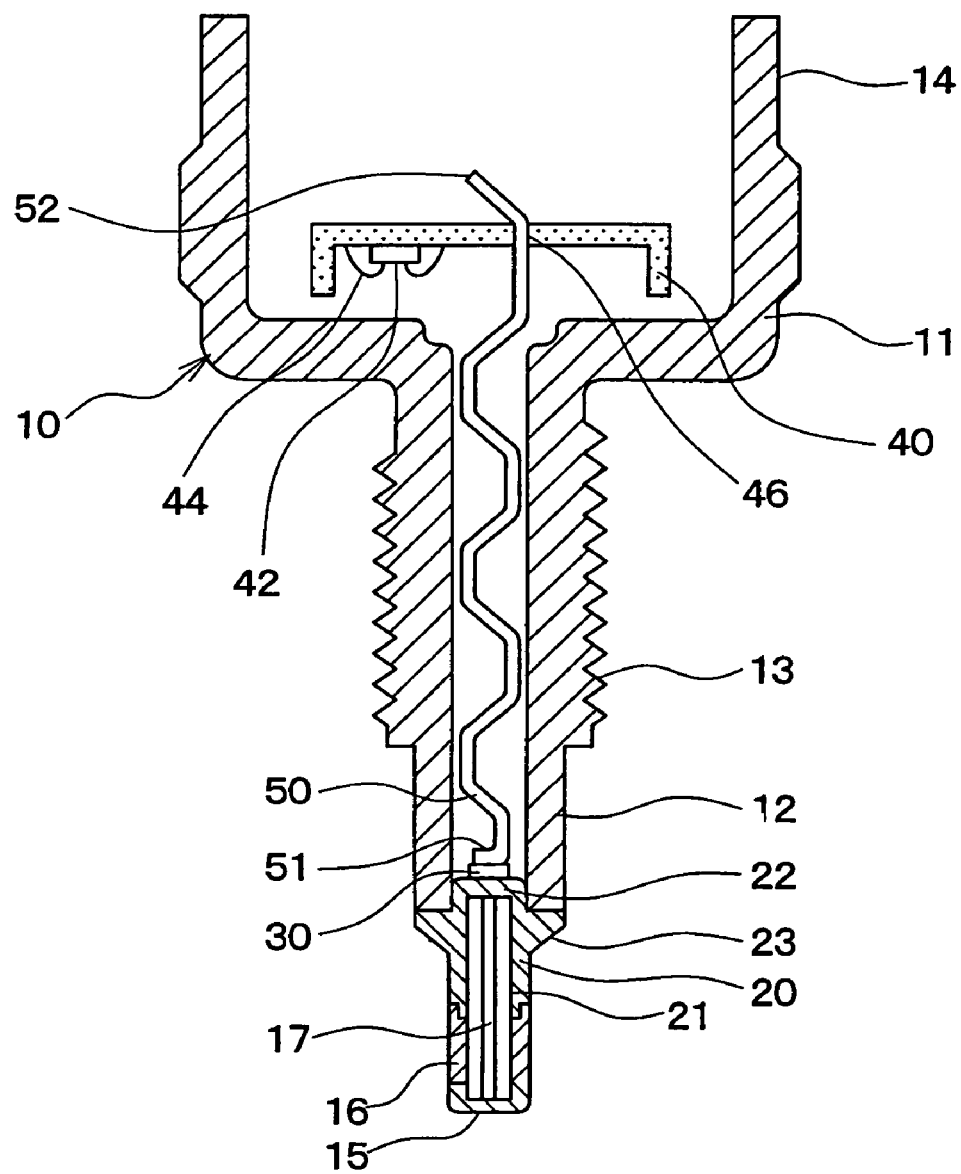
FIG. 2 is a schematic cross-sectional view showing an assembling step of the pressure detection device in FIG. 1.

A specific example of a method of manufacturing the pressure detection device 100 will be described with reference also to FIG. 2. FIG. 2 is a schematic cross-sectional view illustrating a step for forming the pressure detection device 100.

Firstly, the pressure detection element 30 is fixed to the surface of the diaphragm 22 of the metal stem 20 by glass fusing, etc. Then, the metal case 16 and the pressure receiving diaphragm 15 are fixed to the opening portion 21 of the metal stem 20 by welding or the like with the pressure transmission part 17 being inserted into the hollow part of the metal stem 20.

Next, the one end portion 51 of the flexible printed board 50 is connected by soldering to the pressure detection element 30 that is integrated with the metal stem 20.

Next, the flexible printed board 50 is inserted into the pipe portion 12 from the other end portion 52, and the other end portion 52 of the flexible printed board 50 is pulled into an interior of the main portion 11 of the housing 10 from an end portion of the pipe portion 12. Also the metal stem 20 and the pipe portion 12 of the housing 10 are joined and fixed.

Next, the other end portion 52 of the flexible printed board 50 is passed through the through hole 46 of the circuit board 40 having the wire-bonded IC 42, and the other end portion 52 of the flexible printed board 50 is connected to the circuit board 40 by solder or the like. FIG. 2 shows a manufacturing process for forming the pressure detection sensor 100, described above.

In this embodiment, the flexible printed board 50 is bent in a zigzag shape to be extensible and contractible in the connection direction of the one end portion 51 and the other end portion 52. Therefore, when the flexible printed board 50 is located within the housing 10 and is connected to the pressure detection element 30 and the circuit board 40 before the circuit board 40 is fixed to the housing 10, a length of the flexible printed board 50 is extended in the connection direction compared to the state after the fixing of the circuit board 40 to the housing 10 has been completed.

To be more specific, since the bent portion of the flexible printed board 50 is elastically deformable to be extensible and contractible in the connection direction, the length between the one end portion 51 and the other end portion 52 can be extended due to the bent portion when the circuit board 40 is not fixed to the housing 40 as shown in FIG. 2. That is, when no stress is applied to the flexible printed board 50, the length between the one end portion 51 and the other end portion 52 becomes longer than a length in the contracted state shown in FIG. 1.

Next, the circuit board 40 is joined and fixed to the main portion 11 of the housing 10. Then, the connector case 60 is connected to the main portion 11 of the housing 10, and the end portion 14 of the housing 10 is caulked to fix the connector case 60 to the housing 10.

When the connector case 60 is mounted to the housing 10, the terminal 61 is put into spring contact with the circuit board 40 via the spring part 62, thereby being electrically connected to the circuit board 40. In this manner, the pressure detection device 100 shown in FIG. 1 is completed.

Here, when the connections of the flexible printed board 50 with the pressure detection element 30 and with the circuit board 40, and when the fixing of the circuit board 40 to the housing 10 are all completed, the flexible printed board 50 becomes a shape shown in FIG. 1. Therefore, the stress applied to the connecting parts can be effectively released by the elastic force of the bent portion of the printed board 50.

In the above-described manufacturing method of the pressure detection device 100, the pressure detection element 30 and the housing 10 are fixed first, the flexible printed board 50 is contained in the housing 10 to be connected to the pressure detection element 30 and the circuit board 40, and lastly the circuit board 40 and the housing 10 are fixed.

To the contrary, the above-described manufacturing order can be made changed such that, the circuit board 40 and the housing 10 are fixed first, the flexible printed board 50 is contained in the housing 10 to be connected to the pressure detection element 30 and the circuit board 40, and finally the pressure detection element 30 and the housing 10 are fixed. In this case, the circuit board 40 and the other end portion 52 of the flexible printed board 50 are connected and then the one end portion 51 of the flexible printed board 50 is inserted into the pipe portion 12 of the housing 10.

Then, the one end portion 51 of the flexible printed board 50 that is pulled out from the tip portion of the pipe portion 12 and the pressure detection element 30 integrally formed with the metal stem 20 are connected to each other. Subsequently, the metal stem 20 and the housing 10 are joined, and the pressure detection element 30 can be fixed to the housing 10. Even in this case, the same advantages described above can be obtained.

When the connections of the flexible printed board 50 with the pressure detection element 30 as well as with the circuit board 40, and the fixing of the pressure detection element 30 to the housing 10 are completed, the flexible printed board 50 becomes the bent shape shown in FIG. 1. In this case, the stress applied to the connecting parts at which the board 50 is connected with the pressure detection element 30 and the circuit board 40 can be effectively reduced by the elastically deformable bent portion of the board 50.

Moreover, in the above-described manufacturing method, the integrated part constructed with the metal stem 20, the pressure detection element 30, the pressure transmission part 17, the metal case 16 and the pressure receiving diaphragm 15 is joined and this integrated part is assembled to the flexible printed board 50. However, only the metal stem 20 and the pressure detection element 30 can be integrally formed and this integrated part can be employed in the above-described manufacturing method of the pressure detection device 100. In this case, the flexible printed board 50 is contained in the housing 10 and both the pressure detection element 30 and the circuit board 40 are connected to the flexible printed board 50. Then, the pressure detection element 30 and the circuit board 40 may be fixed to the housing 10, and the fixing of the connector case 60 to the housing 10 may be performed in advance. Thereafter, the metal case 16 can be joined to the pressure receiving diaphragm 15 via the pressure transmission part 17.

Figure 3:
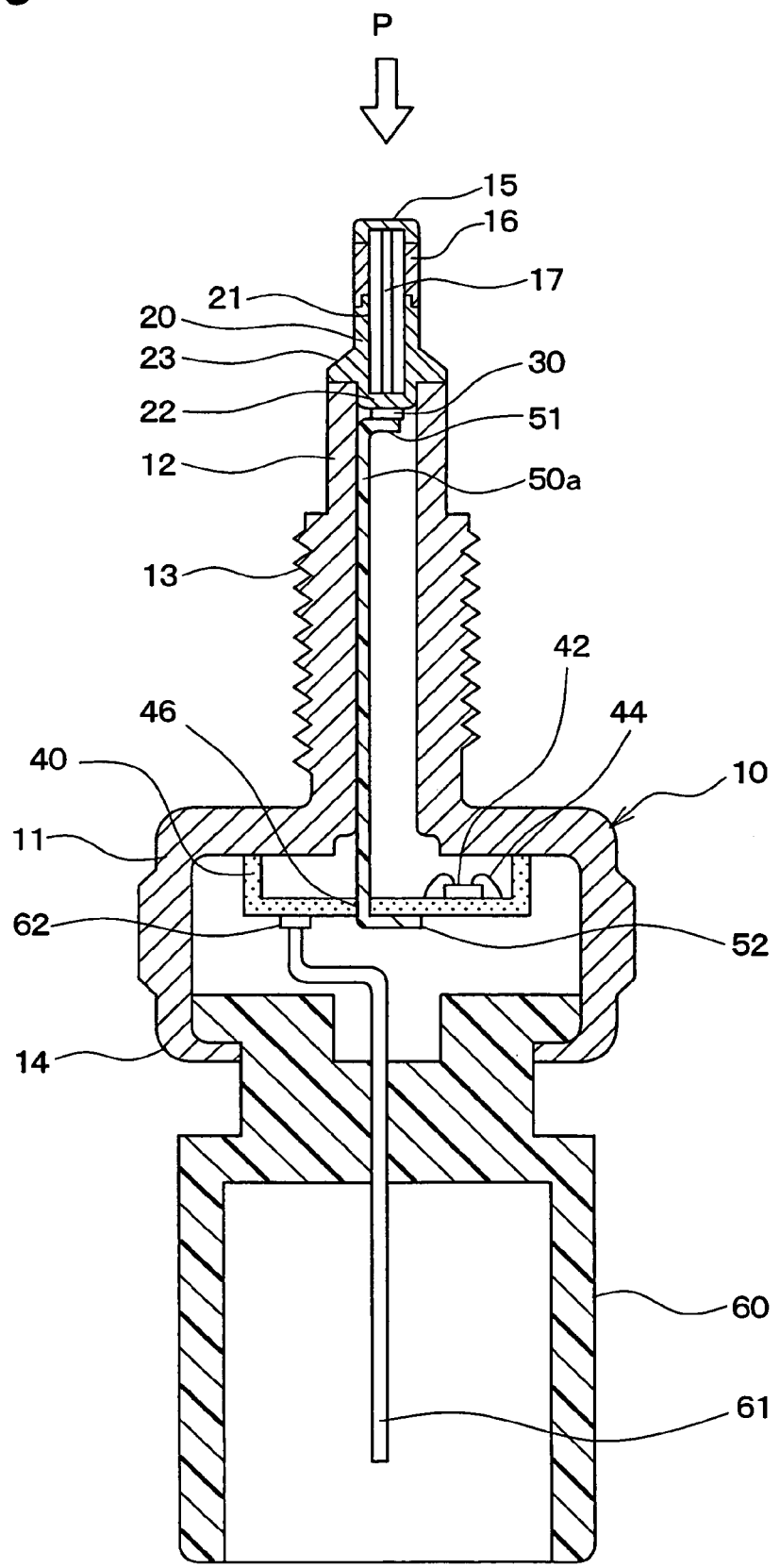
FIG. 3 is a schematic cross-sectional view showing a pressure detection device of a comparison example of the embodiment.

FIG. 3 is a schematic cross-sectional view showing a pressure detection device in a comparison example. In the comparison example shown in FIG. 3, a flexible printed board 50*a* extending straightly between the end portions 51, 52 is used. In this case, a large stress is applied to connecting parts of the flexible printed board 50*a* connected with the pressure detection element 30 and with circuit board 40 and there is a possibility of disconnection at the connecting parts. Further, there is also a possibility of disconnection at the connecting parts of the flexible printed board 50*a*, when the board 50*a* is pulled during a connecting operation.

That is, because the straight part of the flexible printed board 50*a* has a small extensible and contractible force in the connection direction connecting the end portions 51, 52, the board 50*a* does not absorb the stress applied to the connecting parts of the board 50*a*.

However, in the pressure detection device 100 according to this embodiment, because the stress applied to the connecting parts of the flexible printed board 50, connected with the pressure detection element 30 and with the circuit board 40, can be effectively relieved by the elastically deformable bent portion of the flexible printed board 50, these connecting parts are effectively prevented from receiving the stress as much as possible.

Therefore, in the pressure detection device 100 having the pressure detection element 30 at the one end portion of the housing 10 and the circuit board 40 at the other end portion of the housing 10, when these parts (30, 40) are connected to the flexible printed board 50, a disconnection at the connecting parts of the flexible printed board 50 can be effectively avoided, and a more reliable pressure detection device 100 can be provided.

In the pressure detection device 100 according to this embodiment, the flexible printed board 50 has a bent shape to be extensible and contractible in the connection direction connecting the one end portion 51 and the other end portion 52. In this case, the flexible printed board 50 is also connected in a contracted state to the pressure detection element 30 and to the circuit board 40. Therefore, the shape of the flexible printed board 50 can be desirably formed to release the applied stress.

In the example shown in FIG. 1, the flexible printed board 50 is substantially zigzag-shaped to be extensible and contractible in the connection direction, however, can be formed into a coil shape to be extensible and contractible in the connection direction.

According to the above-described manufacturing method of the pressure detection device 100, when the flexible printed board 50 is placed within the housing 10 and connected to the pressure detection element 30 and to the circuit board 40 before the fixing is completed, the flexible printed board 50 is in an extended state where the length between the one end portion 51 and the other end portion 52 of the flexible printed board 50 is extended. After the flexible printed board 50 is connected with both the pressure detection element 30 and the circuit board 40, and after the pressure detection element 30 and the circuit board 40 are fixed to the housing 10, the flexible printed board 50 becomes in a contracted state so that the stress applied to the connecting parts thereof with the pressure detection element 30 and with the circuit board 40 can be released.

That is, when the connections of the flexible printed board 50 with the pressure detection element 30 and the circuit board 40, and the fixings of the pressure detection element 30 and the circuit board 40 to the housing 10 are ended, in an other word, when the assembly is completed, the flexible printed board 50 becomes in the contracted state. Therefore, the stress applied to the connecting parts with the flexible printed board 50 can be released. As a result, the connecting parts with flexible printed board 50 are avoided from receiving the stress.

That is, in a normal using state of the pressure detection element 30, the length between the end portions 51 and 52 is shorter to be not extended. However, when the both end portions 51, 52 are pulled against each other, the bent portions of the flexible printed board 50 are elastically extended. Therefore, one connecting part fixed to the housing 10, to which the flexible printed board 50 is connected first at the time of the assembly, is avoided from receiving the stress when the other connecting part is fixed to the housing 10. Also, when the assembly is completed, the flexible printed board 50 resumes to the normal using state, therefore, the bent portions do not receive the stress either.

In conclusion, according to the manufacturing method of the pressure detection device 100 having the pressure detection element 30 at the one end portion of the housing 10 and the circuit board 40 at the other end portion thereof, when the pressure detection element 30 and the circuit board 40 are connected via the flexible printed board 50, the disconnection at the connecting parts with the flexible printed board 50 can be prevented as much as possible thereby a more reliable pressure detection device can be presented.

In the flexible printed board 50, a zigzagged pattern is not necessarily a repetition of the same shape. For example, a part of the flexible printed board 50 can be zigzagged and the rest of the board 50 can be made straight. In this case, it is preferable to make straight either one part adjacent to the one end portion 51 or the other end portion 52 of the flexible printed board 50, which is to be connected later.

In the example shown in FIG. 2, a part adjacent to the other end portion 52 of the flexible printed board 50, connected to the circuit board 40, can be made straight and a part adjacent to the one end portion 51 of the flexible printed board 50 can be bent to be zigzagged. Owing to this structure, when the circuit board 40 connected with the flexible printed board 50 is joined to the housing 10, the part adjacent to the other end portion 52 of the flexible printed board 50 can be smoothly received within the pipe portion 12 without being stuck halfway in the pipe portion 12.

Also, in the example of FIG. 2, the fixing of the circuit board 40 to the housing 10 is performed, after the pressure detection element 30 is fixed to the housing 10, the flexible printed board 50 is contained in the housing 10 and the flexible printed board 50 is connected to the pressure detection element 30 and to the circuit board 40. However, the fixing of the pressure detection element 30 to the housing 10 can be performed, after the circuit board 40 is fixed to the housing 10, and the flexible printed board 50 is contained in the housing 10 to be connected to the pressure detection element 30 and to the circuit board 40.

OTHER EMBODIMENTS

In the above described embodiment, the pressure receiving diaphragm 15 is connected to the opening portion 21 of the metal stem 20 via the metal case 16. However, the metal stem 20 can be directly welded to the pressure receiving diaphragm 15.

In the above-described embodiment, the pressure detection element 30, which serves as the sensing part, is used. This pressure detection element 30 is attached to the metal stem 20 and receives the detected pressure via the pressure receiving diaphragm 15, the pressure transmission part 17 and the diaphragm 22 of the metal stem 20. However, it is not necessarily limited to the pressure detection element 30 as long as it outputs a signal responsive to the detected pressure applied thereto and it can be attached to the one end portion of the housing 10.

The housing 10 is not limited to the shape having the cylindrical main portion 11 and the pipe portion 12, which have been described as above. The shape of the housing 10 in the example is suitable for the combustion pressure sensor, and the other shapes can be employed for the housing 10.

As the circuit part, it is not necessarily limited to the circuit board 40 having the IC chip 42, which has been described. The circuit part can be other kinds as long as they can be attached to the other end portion of the housing 10 and process the signal from the sensing part.

Also, various kinds of electric connecting methods may be employed for connecting the flexible printed board 50 with the sensing part and with the circuit part.

The circuit board 40, the IC chip 42, the terminal 61 and other parts are provided and electrically connected in the housing 10 in the example as shown in FIG. 1. However, the arrangement of these parts and the connecting method show only an example and they can be suitably changed.

Still further, it is to be understood that the use of the pressure detection device 100 of the present invention is not limited to the combustion pressure sensor.

In conclusion, in the pressure detection device 100 having the sensing part at the one end portion of the housing 10 and the circuit part at the other end portion thereof, only when the flexible printed board 50 has a shape in which the stress applied to the end portions of the board 50 connected with the sensing part and with the circuit part can be released, the other parts and the arrangement thereof can be suitably changed.

While the invention has been described with reference to a preferred embodiment thereof, it is to be understood that the invention is not limited to the preferred embodiment and construction. The invention is intended to cover various modification and equivalent arrangements. In addition, while the various elements of the preferred embodiment are shown in various combinations and configurations, which are preferred, other combinations and configuration, including more, less or only a single element, are also within the spirit and scope of the invention.

What is claimed is:

1. A pressure detection device comprising:
   a housing, the housing having formed therein an approximately cylindrical hollow part elongated in an axial direction;
   a sensing part that is provided at one end portion of the housing to output an electrical signal responsive to an applied pressure;
   a circuit part that is provided at an other end portion of the housing to process the signal from the sensing part; and
   a flexible printed board arranged in the cylindrical hollow part of the housing between the sensing part and the circuit part, the flexible printed board extending entirely in the axial direction and to be elastically deformable in the axial direction, wherein:
   the flexible printed board has a first end portion electrically connected to the sensing part at a first connecting part, and a second end portion electrically connected to the circuit part at a second connecting part; and
   the flexible printed board has a shape between the first and second end portions to relieve a stress applied to the connecting parts.

2. The pressure detection device according to claim 1, wherein the flexible printed board has a bent portion between the first and second end portions, which is elastically deformable in the axial direction connecting the first and second end portions.

3. The pressure detection device according to claim 2, wherein the bent portion of the flexible printed board has a zigzag shape to be extensible and contractible in the axial direction.

4. The pressure detection device according to claim 2, wherein the bent portion of the flexible printed board has a coil shape to be extensible and contractible in the axial direction.

5. The pressure detection device according to claim 2, wherein the bent portion is bent relative to the axial direction.

6. The pressure detection device according to claim 1, wherein the flexible printed board is connected to the sensing part and the circuit part in the housing in a contracted state to be extensible and contractible in the axial direction connecting the first and second end portions.

7. The pressure detection device according to claim 1, wherein the first connecting part is located in the cylindrical hollow part of the housing at the one end portion in the axial direction, and the second connecting part is located in the housing outside of the cylindrical hollow part.

8. The pressure detection device according to claim 1, wherein:
   the housing includes a threaded portion disposed on a part of its outer surface radially outside of the cylindrical hollow part; and
   the housing is capable of being fixed via the threaded portion.

9. The pressure detection device according to claim 1, wherein a length of the cylindrical hollow part in the axial direction is longer than an inside diameter of the cylindrical hollow part in a radial direction.

10. A method for manufacturing a pressure detection device comprising:
    preparing a flexible printed board having first and second end portions and an elastically deformable portion between the first and second end portions;
    providing a sensing part for outputting an electrical signal responsive to an applied pressure at one end portion of a housing, the housing having formed therein an approximately cylindrical hollow part elongated in an axial direction;
    providing a circuit part for processing the signal from the sensing part at an other end portion of the housing;
    disposing the flexible printed board in the housing to be connected to the sensing part and the circuit part at the first and second end portions such that the sensing part and the circuit part are electrically connected via the flexible printed board, the flexible printed board extending entirely in the axial direction and to be elastically deformable in the axial direction; and fixing the sensing part and the circuit part to the housing, wherein:

the flexible printed board is disposed in the housing in an extended state of a length between the first and second end portions of the flexible printed board when the flexible printed board is connected to the sensing part and the circuit part before the fixing of the sensing part and the circuit part is completed; and the flexible printed board is disposed in the housing in the contracted state of the length after the fixing of the sensing part and the circuit part is completed.

11. The method for manufacturing the pressure detection device according to claim 10, wherein in the preparing, the elastically deformable portion of the flexible printed board is formed into a zigzag shape to be extensible and contractible in the axial direction connecting the first and second end portions.

12. The method for manufacturing the pressure detection device according to claim 10, wherein in the preparing, the elastically deformable portion of the flexible printed board is formed into a coil shape to be extensible and contractible in the axial direction connecting the first and second end portions.

13. The method for manufacturing the pressure detection device according to claim 10, wherein:

the fixing includes a first fixing step for fixing the sensing part to the housing, and a second fixing step for fixing the circuit part to the housing; and the second fixing step is performed, after the first fixing step is performed and the flexible printed board is disposed in the housing to be connected to both the sensing part and the circuit part.

14. The method for manufacturing the pressure detection device according to claim 10 wherein:

the fixing includes a first fixing step for fixing the sensing part to the housing, and a second fixing step for fixing the circuit part to the housing; and the first fixing step is performed, after the second fixing step is performed and the flexible printed board is disposed in the housing to be connected to both the sensing part and the circuit part.

15. The method for manufacturing the pressure detection device according to claim 10, wherein:

the first end portion of the flexible printed board is electrically connected to the sensing part at a first connecting part, the second end portion of the flexible printed board is electrically connected to the circuit part at a second connecting part; and the first connecting part is located in the cylindrical hollow part of the housing at the one end portion in the axial direction, and the second connecting part is located in the housing outside of the cylindrical hollow part.

16. The method for manufacturing the pressure detection device according to claim 7, wherein:

the housing includes a threaded portion disposed on a part of its outer surface radially outside of the cylindrical hollow part; and wherein the housing is capable of being fixed via the treaded portion.

17. The method for manufacturing the pressure detection device according to claim 7, wherein in the preparing before the fixing, the flexible printed board has a first length in the axial direction; after the fixing, the flexible printed board has a second length in the axial direction, the second length being smaller than the first length; and the disposing and the fixing are performed without a step of bending the flexible printed board.

18. The method for manufacturing the pressure detection device according to claim 10, wherein a length of the cylindrical hollow part in the axial direction is longer than an inside diameter of the cylindrical hollow part in a radial direction.

* * * * *